United States Patent
Baker et al.

(10) Patent No.: US 6,898,279 B1
(45) Date of Patent: May 24, 2005

(54) METHODS AND COMPUTER READABLE MEDIA FOR CREATING DIALING STRINGS USEFUL IN AN INTERNATIONAL DIAL-UP SESSION FOR TRANSFERRING DATA

(75) Inventors: Jennifer Baker, Park City, UT (US); Rich Erekson, Roy, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/201,673

(22) Filed: Nov. 30, 1998

(51) Int. Cl.[7] .............................................. H04M 3/00
(52) U.S. Cl. ............................ 379/355.08; 379/121.01
(58) Field of Search ........................ 379/355.01, 355.02, 379/355.04, 355.07, 355.08, 355.09; 455/456.1, 456.2, 456.3, 445

(56) References Cited

U.S. PATENT DOCUMENTS

| | | | | |
|---|---|---|---|---|
| 5,455,858 A | * | 10/1995 | Lin ........................ | 379/355.08 |
| 5,475,743 A | * | 12/1995 | Nixon et al. ........... | 379/355.07 |
| 5,668,955 A | * | 9/1997 | deCiutiis et al. ....... | 379/355.08 |
| 5,859,901 A | * | 1/1999 | Brendzel et al. ....... | 379/355.08 |
| 6,192,124 B1 | * | 2/2001 | Yim ....................... | 379/355.08 |
| 6,292,557 B1 | * | 9/2001 | Gabara ................... | 379/355.08 |

* cited by examiner

Primary Examiner—Minsun Oh Harvey
Assistant Examiner—Jefferey Harold
(74) Attorney, Agent, or Firm—Workman Nydegger

(57) ABSTRACT

Methods and computer readable media are provided for creating a dialing string. The dialing strings are used in a dial-up session to establish a communications link for transferring data between computing configurations from an origination location to a destination location. In a preferred embodiment, queries are made regarding geographic information of the origination and a destination locations. In response thereto, a database is searched for phone dialing codes, such as foreign country codes and regional city codes, that correspond to the geographic information. The codes are then fashioned into the dialing string. Preferably, a dial-up manager serves to provide the functions of querying about the geographic locations, searching the database and fashioning the dialing string. It is a feature of this invention that the dial-up manager also monitor the actual dialing of the dialing string to determine whether a communications link between the origination and destination locations is ever established. In the event that the link is not established, troubleshooting assistance is provided to enable the eventual establishment of the dial-up session.

16 Claims, 4 Drawing Sheets

METHODS AND COMPUTER READABLE MEDIA FOR CREATING DIALING STRINGS USEFUL IN AN INTERNATIONAL DIAL-UP SESSION FOR TRANSFERRING DATA

BACKGROUND OF THE INVENTION

1. The Field of the Invention

The present invention relates generally to dial-up sessions for transferring data between computing configurations. More specifically, the present invention relates to methods and computer executable instructions for creating numeric dialing strings facilitating the dial-up session. Even more specifically, the present invention relates to creating dialing strings useful when calling and transferring data internationally.

2. The Relevant Technology

In a data communications environment, data is transferred between computing configurations, such as from a sender to a receiver, via a transmission medium during a dial-up session. Often times, the transmission medium is a phone line and the transfer requires the dialing of a numeric string of numbers at the sender's end in order to establish the connection.

Typically, this numeric string of numbers includes some or all of the following: getting out of a hotel, navigating local phone return, extra digits required to dial from one country to another or to dial locally which could result, for example, with a seven-digit phone number; a three-digit area code; a fourteen to sixteen-digit billing number; a delay or pause code for causing a delay between the phone number and billing information numbers, and any other numbers, such as "9," to access a line "outside" of the building or exchange in which the sender is located.

When the sender is dialing from a familiar environment, the actual numeric string used during a dial-up session is often programmed into computer memory and is usually dialed without incident. In an unfamiliar environment, however, the formulation or creation of the actual dialing string can often be quite problematic. For example, many times, the delay codes, the outside access line codes, etc., are unknown to the sender. As such, the sender must exercise trial and error methodologies until the communications link for transferring the data can be established. Adversely, this requires valuable time and perhaps never establishing a connection resulting in lost business.

This problem is even further compounded when a sender is trying to establish a dial-up session in a foreign country for domestic or international data transfers. For example, in addition to having to know the previous items of the dialing string, the sender must typically also know and include another four to six digits of numbers for the foreign country and/or regional codes plus numbers to get out of hotel, navigate local phone system, and prier calling card numbers. Problematically, these numbers are often unknown and cannot be intuitively ascertained.

Outside access line codes, although frequently intuitive to persons located within the United States, often seem random and/or sporadic in other countries. Billing information numbers, that affect the length and sequence of the dialing string, are often also implicated as senders are billed for data transfers when dialing from countries other than the credit cards' country of origin. As such, this can cause frustration to the user and tremendously lengthen the time it takes to establish a communications link.

While known computer software has been developed to assist users in overcoming the foregoing frustrations and problems, in general, the software is little more than a presentation of options to be selected by users to facilitate the dial-up session. An example of an option includes choices provided to users such as whether the outside access line code is a numeral "9" or a "0" or a "1," etc. The users are, then, to fill in a blank with the appropriate numeral. This, however, presupposes that the user is aware of what the appropriate numeral should be. This does little, if anything, to help users in actually creating or formulating the dialing string when the user is unaware of the numeric values that should be included.

Additionally, once a dialing string is dialed and used to try and establish a connection between a sender and receiver for the transfer of data, prior art software ceases to provide useful assistance thereafter. For example, if the dialing string fails to establish the connection necessary for the dial-up session, the user is not informed as to whether it was failure of the dialing string or whether it was some other reason. Likewise, troubleshooting assistance and procedures for overcoming the failed connection are absent.

Accordingly, it would be an advance to provide users with means for formulating or creating numeric dialing strings for the domestic or international transfer of data. It would also be an advance to provide follow-on assistance in the event of failure while users are attempting to establish the communications link necessary to transfer the data.

OBJECTS AND SUMMARY OF THE INVENTION

It is, therefore, an object of the present invention to provide means for creating numeric dialing strings facilitating a dial-up session for the transfer of data between computing system configurations.

It is another object of the present invention to provide means for creating international numeric dialing strings for dial-up sessions.

It is still another object of the present invention to provide means for creating dialing strings when a user is substantially unaware of the numeric values necessary therefor.

It is yet another object of the present invention to provide assistance to users during the creation of dialing strings.

It is still yet another object of the present invention to provide means for indicating whether dialing strings provide connection during a dial-up session.

It is a further object of the present invention to supply user assistance when dialing strings fail to establish connections during a dial-up session.

It is an even further object of the present invention to provide methods and computer readable media for achieving the foregoing.

In accordance with the invention as embodied and broadly described herein, the foregoing and other objectives are achieved by providing methods and computer readable media for creating dialing strings. The dialing strings are then used in a dial-up session to establish a communications link for transferring data between computing configurations from an origination location to a destination location.

In a preferred embodiment, queries are made regarding geographic and site information of the origination and a destination locations. In response thereto, a database is searched for phone dialing codes, such as foreign country codes and regional city codes outside access calling card format which depends on international or local standards, plus calling card information and any information that is needed for a successful connection, that correspond to the geographic and site information. The codes are then fashioned into the dialing string.

Preferably, a dial-up manager, operable in a variety of operating systems at the origination location, serves to provide the functions of querying about the geographic and site locations, initiating searching of the database and fashioning the dialing string. A look-up table having various information associated with numeric phone dialing codes, such as geographic locations, site locations and regional locations, serves as a preferred database.

It is a feature of this invention that the dial-up manager also monitors the actual dialing of the dialing string to determine whether a communications link between the origination and destination locations is ever established. In the event the link is established, the dialing string is associated with the origination and destination locations to help remember what it took to get a successful connection next time one fails. In the event that the link is not established, troubleshooting assistance is provided to enable the eventual establishment of the dial-up session.

Yet another feature of the manager is an automated dial that tries varieties of dial strings until a successful connection is made.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention relates to "dial-up" sessions where a user at one computing configuration dials a dialing string, comprised of phone dialing codes, to establish a communications link for transferring data/receiving data to another computing configuration. This invention specified that methods and computer readable media are taught to provide assistance in the actual creation of the numeric dialing strings regardless if the dial-up session is domestic or international in nature. It is a feature of this invention that the following methods and computer executable instructions also provide assistance during the actual dialing of the dialing string to determine whether the communications link is ever established. In the event that the link is not established, troubleshooting assistance is provided to enable the eventual establishment of the dial-up session.

In accordance with the present invention, diagrams are used herein to illustrate either the structure or processing of embodiments used to implement the system and method of the present invention. Using the diagrams in this manner to present the invention, however, should not be construed as limiting of its scope but merely as representative.

Figure 1:
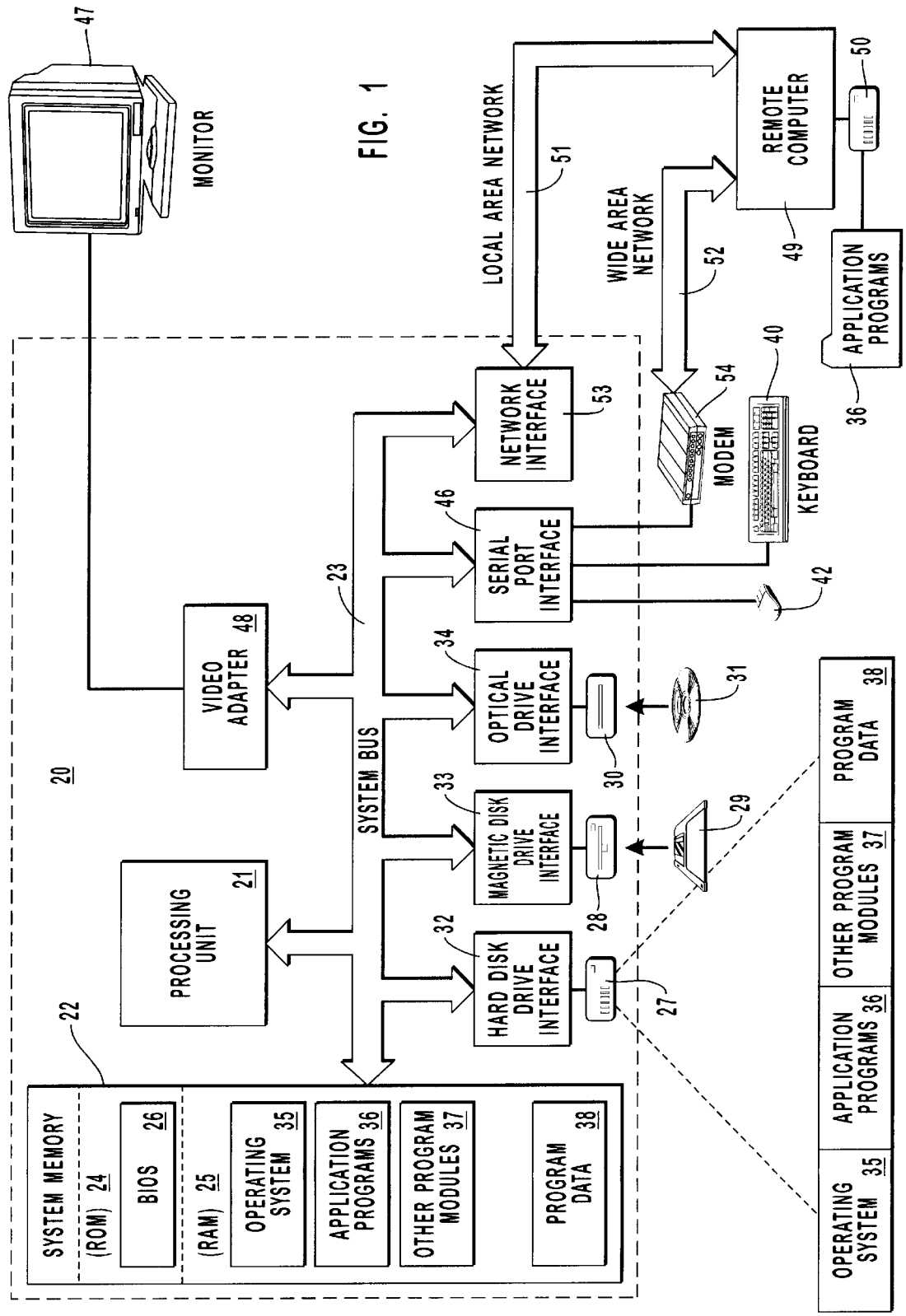
FIG. 1 is an exemplary system for providing a suitable operating environment for the present invention.

FIG. 1 and the following discussion are intended to provide a brief, general description of a suitable computing environment in which either the structure or processing of embodiments may be implemented. Since the following may be computer implemented, particular embodiments may range from computer executable instructions as part of computer readable media to hardware used in any or all of the following depicted structures. Implementation may additionally be combinations of hardware and computer executable instructions.

When described in the context of computer readable media having computer executable instructions stored thereon, it is denoted that the instructions include program modules, routines, programs, objects, components, data structures, etc. that perform particular tasks or implement particular abstract data types upon or within various structures of the computing environment. Executable instructions exemplarily comprise instructions and data which cause a general purpose computer, special purpose computer, or special purpose processing device to perform a certain function or group of functions.

The computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media. For brevity, computer readable media having computer executable instructions may sometimes be referred to as "software" or "computer software."

With reference to FIG. 1, an exemplary system for implementing the invention includes a general purpose computing device in the form of a conventional computer 20. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD-ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media which can store data accessible by a computer include magnetic cassettes, flash memory cards, digital video disks, removable disks, Bernoulli cartridges, random access memories (RAMs), read only memories (ROM), and the like.

Other storage devices are also contemplated as available to the exemplary computing system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general, however, the various storage devices may be partitioned into two basic categories. The first category is local storage which contains information that is locally available to the computer system. The second category is remote storage which includes any type of storage device that contains information that is not locally available to a computer system. While the line between these two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through user interface input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, computers often include other peripheral output devices (not shown), such as speakers and printers. Scanner peripheral devices (not shown) for reading data, imagery, graphics or other information into the computer are often also included.

The computer 20 may operate in a networked environment using logical connections to one or more other computing configurations, such as remote computer 49. Remote computer 49 may be a personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 between the computer 20 and the remote computer 49 include a local area network (LAN) 51 and a wide area network (WAN) 52 that are presented here by way of example and not limitation. Such networking environments are commonplace in offices enterprising wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the local or remote memory storage devices and may be linked to various processing devices for performing certain tasks. It will be appreciated that the network connections shown are exemplary and other means of establishing a communications link between the computers may be used.

Moreover, those skilled in the art will appreciate that the invention may be practiced with other computer system configurations, including hand-held devices, multi-processor systems, microprocessor-based or programmable consumer electronics, network PCs, minicomputers, computer clusters, mainframe computers, and the like.

Figure 2:
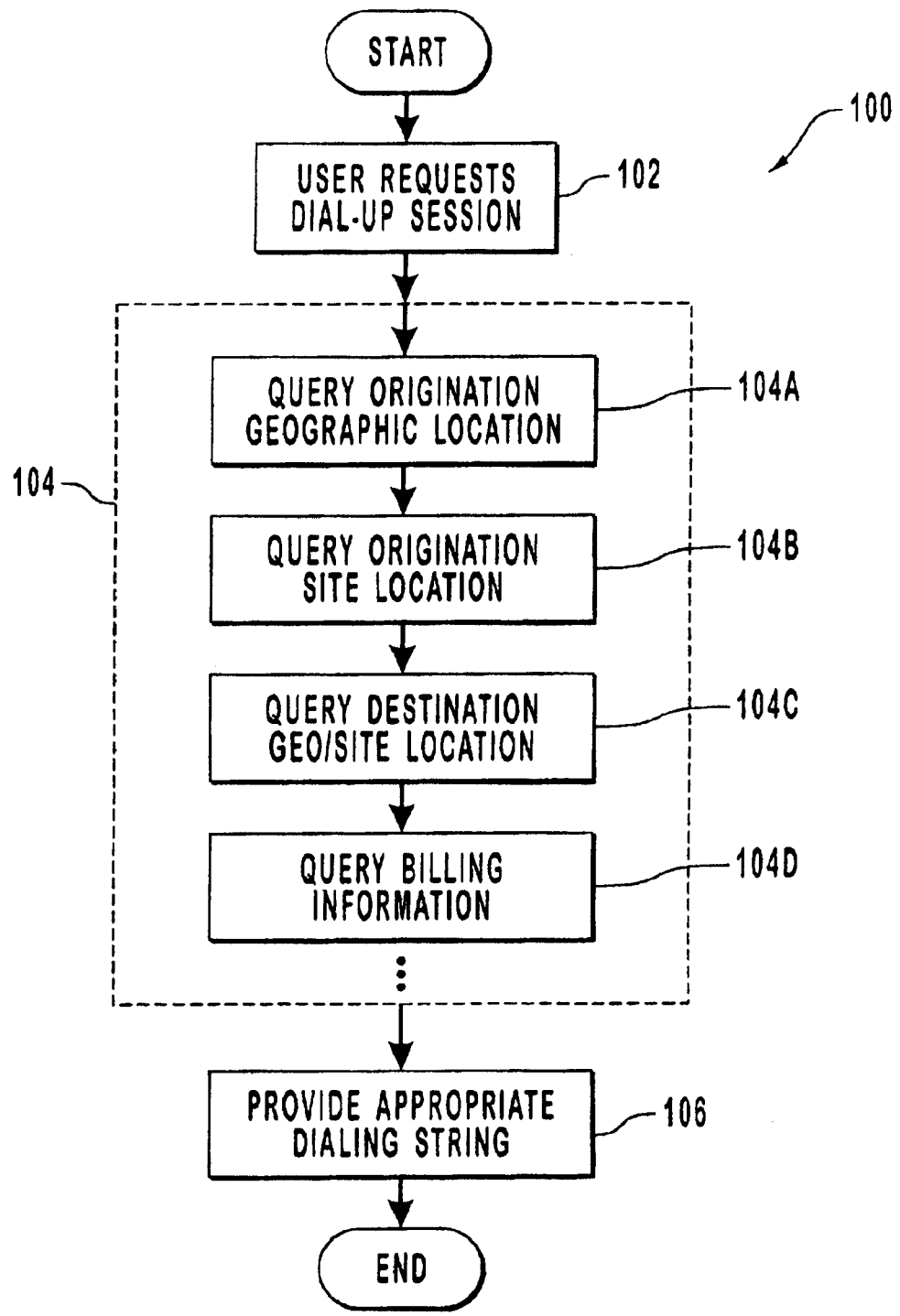
FIG. 2 is a flow diagram of the overall hierarchical operation for creating a dialing string for a dial-up session in accordance with the present invention.

With reference to FIG. 2, a flow diagram of the overall hierarchy for creating a dialing string for a dial-up session in accordance with the present invention is depicted generally as method 100. As described herein, a dial-up session is where a user at one computing configuration (origination location) dials a dialing string to establish a communications link for transferring data to a user at another computing configuration (destination location).

At step 102 a user requests or initiates the dial-up session. This can be performed in a variety of ways. For example, these sessions are presently requested by "clicking" an appropriate icon with a user interface device, such as a mouse, or by "pulling" down a menu and highlighting an appropriate menu item contained therein. Still other request means are known but are beyond the scope of this invention.

At step 104 a plurality of queries are made to ascertain essential information regarding the origination and destination locations. For example, at step 104A queries are made regarding the geographic location of the origination location. Examples of geographic locations include, but are not limited to, the names of countries, continents, states, cities, regions, townships, etc. At step 104B queries are made regarding a site of the origination location. As distinguished from geographic locations, specific examples of sites include, but are not limited to, specific hotels, corporations, restaurants, or sites having unique requirements such as aircraft, ships, etc. At step 104C geographic and/or site location queries are made for the destination location. In this manner, these queries reveal specific information regarding from where, and to where, data is to be transferred during the dial-up session. At step 104D other queries include ascertaining a billing information, such as a credit card number, for whom a charge will accrue in the event the dialing string is a long distance phone call, for example. Although not illustrated, it will be appreciated that still other queries include specific items such as the actual phone number of the destination location.

Once the queries have been made regarding information of the origination and destination locations, in steps described hereafter, an appropriate dialing string is provided at step 106 for dialing from the origination location to the destination location to ultimately transfer data during a dial-up session. An example of a dialing string is:

9,011-43-512-466-7254,XXXXXXXXXXXXXXXX;

where 9 is representative of an outside access line code at the origination location; a comma is representative of a delay or pause code; 011 is representative of an international call code; 43 is representative of a country code for Austria; 512 is representative of a regional code for the city of Innsbruck, Austria; 466-7254 is representative of the phone number at the destination location; and the XXXXXXXXXXXXXXXX is representative of a 16 digit credit card number providing a billing information for the international call.

It may be that more than one dialing string could prove useful in actually establishing a communication link. As such, a hierarchy of dialing strings may be provided at step 106. It is contemplated that this hierarchy would have a primary and a plurality of secondary or back-up dialing strings or a primary dialing string, followed sequentially by a secondary dialing string, a tertiary dialing string, etc.

Figure 3:
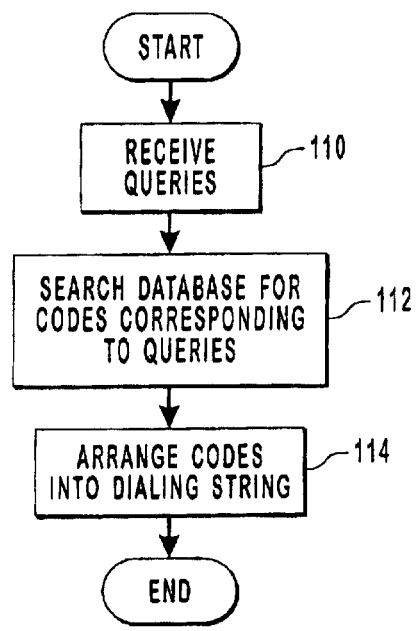
FIG. 3 is a flow diagram for providing an appropriate dialing string in response to a plurality of queries as invoked by the routine of FIG. 2.

In a preferred embodiment, a method for providing an appropriate dialing string in response to a plurality of queries about the origination and destination locations is described with reference to FIG. 3. In this figure, at step 110 the responses to the queries are received. In a preferred embodiment, the response are received as an indication provided from a user interface selection device, such as a keyboard.

Once received, specific information about the origination and destination locations is known. For example, the origination location might include a site location of a Marriott Corp. hotel in a geographic location of Paris, France. The destination location might include a site location of a 3 Com. Corporation branch office in a geographic location of Innsbruck, Austria.

At step 112, a database is then searched for codes corresponding to this information about the origination and destination locations. For example, the site code of the Marriott Corp. hotel in Paris, France, might require a digit "9" to be dialed in order to get an outside access line. Since the destination location is a country different from the country of the origination location, the dial-up session will require an international call. Thus, an international line code is provided. The country and regional city codes are also provided, i.e., Austria (43) and Innsbruck (512). In a preferred embodiment, the specific site and geographic locations of the destination and origination locations are searched in a look-up table for phone dialing codes corresponding thereto.

Thereafter, at step 114 the codes found in the database are fashioned into an appropriate dialing string for establishing a communications link between the origination and destination locations. Eventually, this will allow the transfer of data from one computing system configuration to another.

It will be appreciated that the database against which the responses to the queries are searched, provides most of the information necessary to create the dialing string. As such, this puts the burden of knowledge on the system and not on the user as is done in the prior art. For example, since the geographic location of both the origination and the destination locations is now known, the present invention understands whether the dialing string will be for an international or domestic transfer of data. Then, this invention understands whether the dialing string requires an international call code or not. Likewise, since the site location is now known, it is understand what the site location requires to have an outside access line. As another example, since the geographic location of the origination location is known and since many credit card billings require various special codes for usage in a country other than the United States, the present invention, when formulating the billing information portion of the dialing string, may now properly include any and all foreign billing codes. In this manner, the user is substantially excused from having to know or guess at unknown numbers or esoteric protocols when formulating a dialing string. This greatly advances the state of the prior art.

In a further comparison between this and the prior art, it will be appreciated that users are no longer required to know the numbers used in the dialing string beyond that of the phone number at the destination location. Now all users are required to know is the geographic and, perhaps site locations, of the origination and destination locations. However, since users must already know this information in order to create a communications connection therebetween, this is a non-existent burden. As a result, users are free from having to know outside access line codes, foreign country codes, regional codes, private branch exchange codes, delay codes, foreign billing codes, etc.

Figure 4:
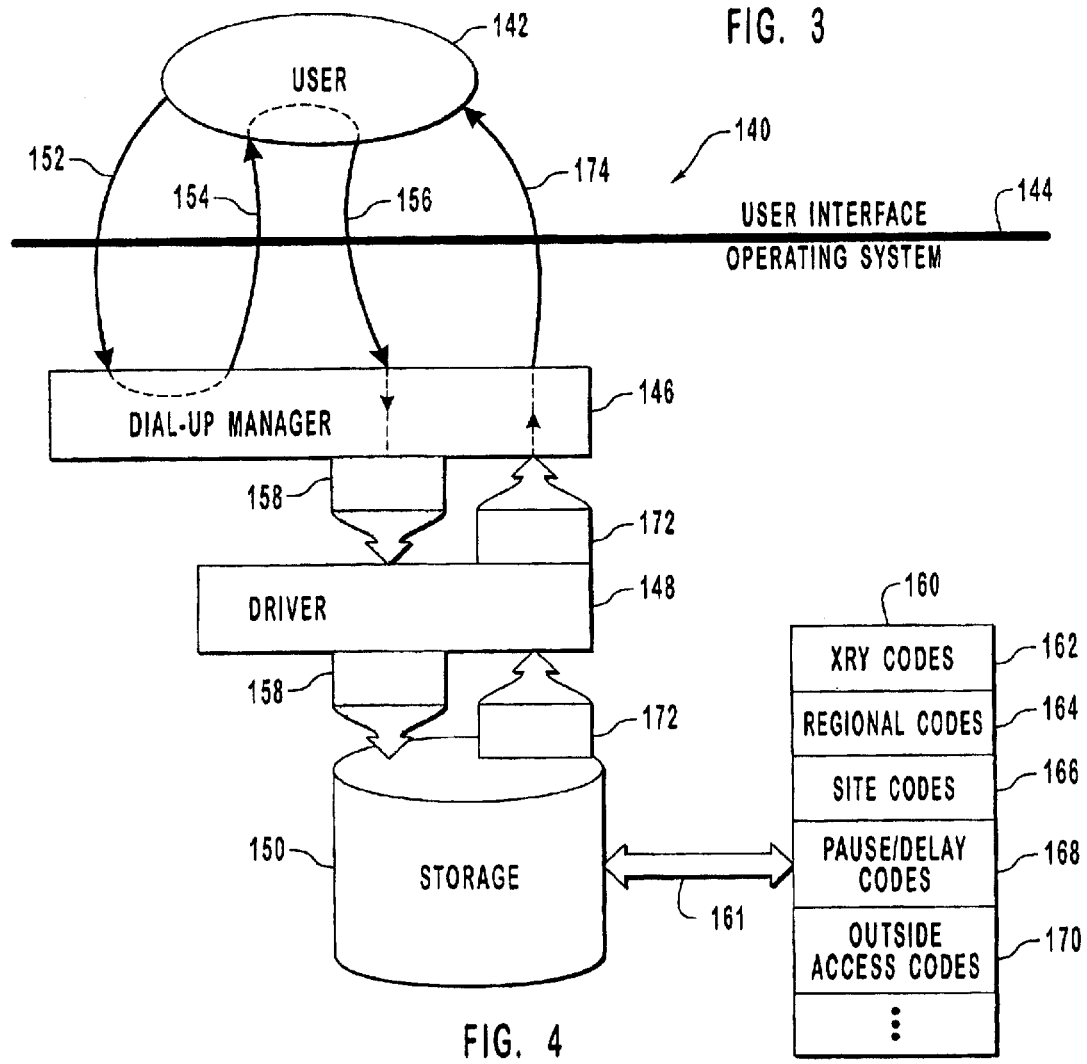
FIG. 4 is a diagram of a preferred architecture for creating a dialing string.

With reference to FIG. 4, a preferred architecture for creating a dialing string in accordance with the foregoing is depicted generally as 140. In this architecture, a user 142 operates within the user interface component of the invention. Whereas, the software of the invention operates within the operating system component of the invention. The distinction between the user interface and the operating system components are indicated by line 144.

In general, within the operating system component is a dial-up manager 146, a driver 148 and a storage means 150. The operations, functions and interrelationships of these devices will be described in the context of the following example.

As before, a user requests a dial-up session indicated as line 152. In response to this request for a dial-up session, the dial-up manager responds with a plurality of queries regarding the origination and destination locations, indicated as line 154. In response to the queries, the user 142 responds, preferably with various user input devices, with indications about the geographic, site, billing information, destination phone number, etc., as indicated by line 156.

Once the responses to the queries are known, the dial-up manager 146 formulates a request packet 158 for passage to the storage means 150 to search the database 160 in order to ascertain the codes corresponding to the responses. In a preferred embodiment, the database includes, but is not limited to, a look-up table having numeric phone dialing codes corresponding to various countries, regions, sites, etc. Specific examples of codes in the database 160 preferably include codes such as the country codes 162, regional codes 164, site codes 166, delay codes 168, outside access line codes 170, etc. Ascertainment of the codes in this manner is preferable accomplished by various driver(s) 148 via read/write commands or mechanisms 161. Driver(s) such as these are well known in the art and are not described herein in detail. In general, however, these driver(s) more efficiently access the contents of the storage means by formulating the request packet into an appropriate format as a function of various parameters in which the present invention is employed. Such parameters include, but are not limited to, particular operating systems, particular storage means, whether the storage is remote or local, etc.

Once the codes responsive to the request packet are ascertained, the codes 172 are passed back to the dial-up manager 148. Again, this may optionally include passage via the driver means 148. Upon reception, the dial-up manager formulates the codes into an appropriate dialing string and passes the dialing string, indicated as line 174, back to the user 142. Ultimately, this dialing string will be used to transfer data between the origination and destination locations during a dial-up session. Again, the dialing string provided to the user may comprise a hierarchy of dialing strings having a plurality of backup dialing strings and/or a preferred priority of usage.

Aside from providing the querying, the formulation of the codes into a dialing string and the formulation of proper request packets for passage to the storage means for the searching of the storage means, various other functions are performed by the dial-up manager 148 that are readily intimated by the foregoing description. For example, in providing queries to the user, the dial-up manager formulates the queries into a suitable format for display to a user 142 on a display device 47. Likewise, the dial-up manager is responsible for retrieving the queries and for receiving response to the queries as indicated by the user via various user interface selection devices.

Once the dialing string is provided to the user, the user will eventually cause the dialing string to be dialed so that an actual communications link between the origination and destination locations can be established. As further advantage of the present invention over the prior art, the attempt to establish this communications link is monitored, so that in the event a connection is not established, troubleshooting assistance can be provided to the user. This is heretofore unknown.

Figure 5:
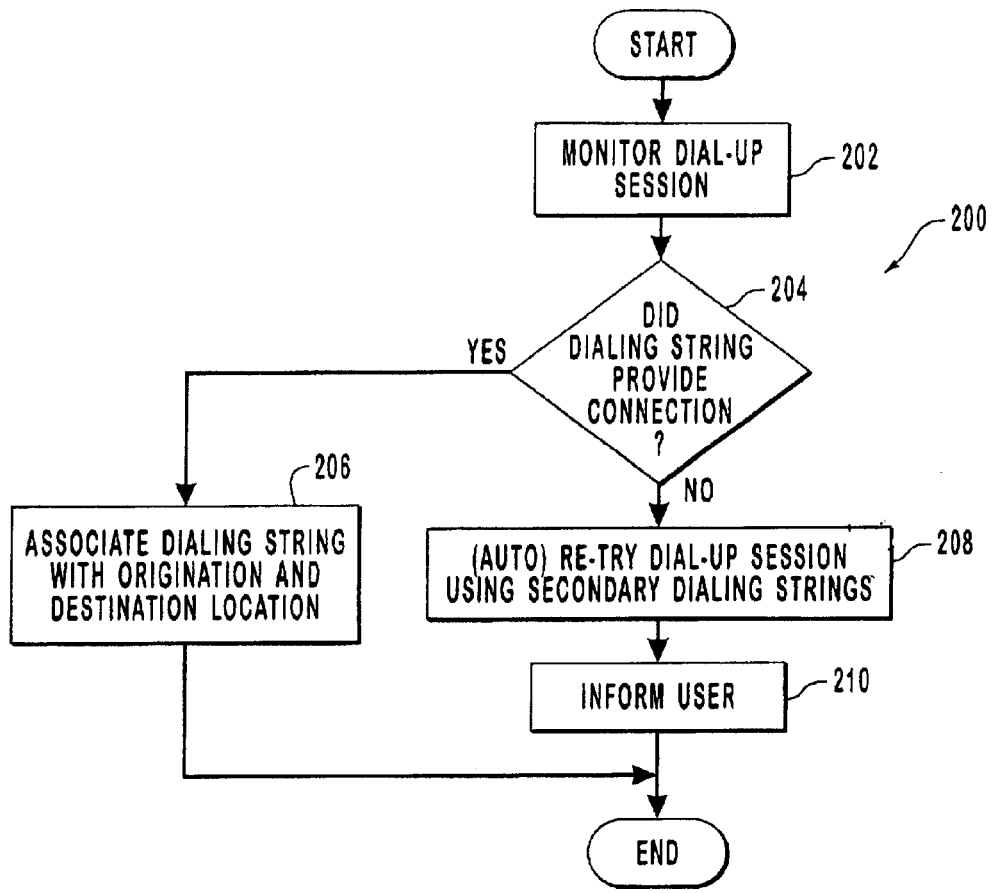
FIG. 5 is a flow diagram for providing user assistance in establishing a dial-up session.

With reference to FIG. 5, a method for providing troubleshooting assistance in establishing a dial-up session is depicted generally as method 200. At step 202 the dial-up session is monitored. At step 204 if the dialing string actually provides a connection between the origination and the destination locations, the troubleshooting assistance for the dialing string is complete and the dialing string, at step 206, is associated as an appropriate dialing string for establishing a connection from the origination to the destination locations. This association may be accomplished in the previous architecture by various known write commands from the dial-up manager 146 to the database 160.

If the dialing string does not provide a connection between the origination and destination locations, at step 208 an automatic retry of the connection is attempted using another dialing string (secondary dialing string) from the hierarchy of dialing-strings. This retry is preferably initiated by the dial-up manager 146. In this manner, the user is substantially freed from monitoring the attempted connection and from retrying to establish communications. Thereafter, at step 210 the user is informed as to the status of the attempted communications. In the event the secondary dialing string provides a communications connection, the secondary dialing string is then associated as an appropriate dialing string between the origination and destination locations. It is even contemplated that the hierarchy of the dialing strings will be reordered with the secondary dialing string replacing the "primary" dialing string as the primary dialing string.

With the foregoing method 200, however, it will be appreciated that the retrying of the dial-up session until a connection is established may be reiteratively attempted until such time as a connection is established or the hierarchy of dialing string is exhausted. Informing the user at step 210 is then still valid as to the status of the attempted communications.

Figure 6:
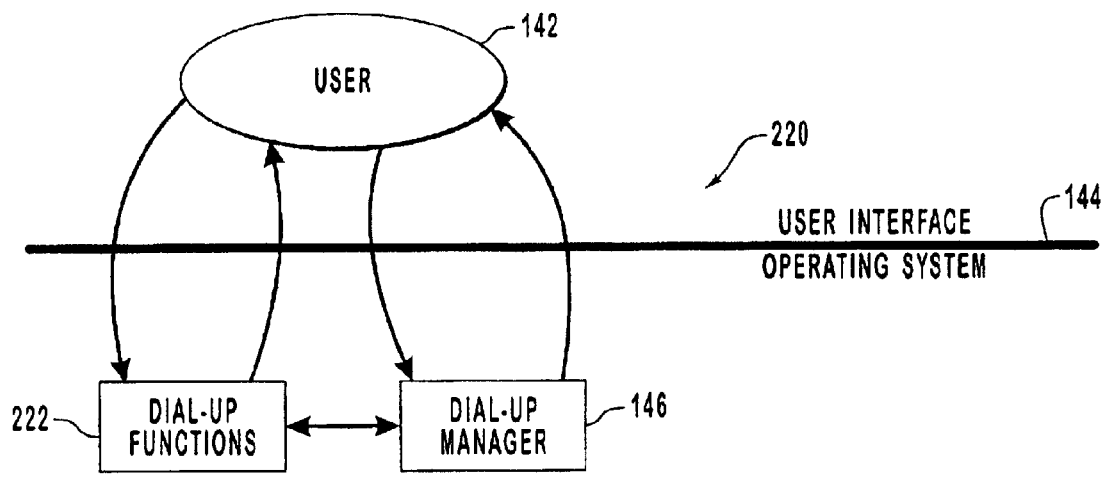
FIG. 6 is a diagram of a preferred architecture for providing user assistance in establishing a dial-up session.

With reference to FIG. 6, a preferred architecture for providing user assistance in establishing a dial-up session, in accordance with FIG. 5, is depicted generally as 220. In this figure, the user 142 bi-directionally communicates with various dial-up functions 222 to actually cause the dialing of the dialing string and ultimately the data transfer. Simultaneously, the user is in bi-directional communication with the dial-up manager 146. The dial-up manager 146 monitors the dial-up session that is being performed by the dial-up functions 222, so that in the event of a failed connection, the dial-up manager can initiate an automatic retry and inform the user. Although not depicted, various driver means may also be utilized in assisting the dial-up manager in its functions of monitoring, informing the user, associating appropriate dialing strings and attempting retries.

In contrast to the prior art, the foregoing methods and architectures do not ignore information regarding the specific locations of the origination and destination locations. In this manner, the architecture is able to create the dialing string instead of relying upon the user to construct their own dialing string. User assistance is also provided that is absent in the prior art.

The present invention may be embodied in other specific forms without departing from its spirit or essential characteristics. Thus, the described embodiments are to be considered in all respects as illustrative only and not restrictive. The particular scope of the invention is indicated by the appended claims rather than by the foregoing description. All changes that come within the meaning and range of equivalency of the claims are to be embraced within their scope.

What is claimed is:

1. A method for creating a dialing string for use in a transfer of data from an origination location to a destination location, the steps comprising:

requesting transfer;

querying a user for at least one geographic location identifier corresponding to at least one of said origination and destination locations;

receiving from the user said at least one geographic location identifier;

utilizing said received geographic location identifier to generate a hierarchy of dialing strings, said hierarchy having at least one primary and one secondary dialing string, each said dialing string having at least one code corresponding to at least one of said origination or destination locations;

dialing one of said dialing strings of said hierarchy of dialing strings to establish a connection between said origination and destination locations;

monitoring said step of dialing to determine whether said connection is established; and wherein said connection is not established, further comprising the step of dialing another of said dialing strings of said hierarchy of dialing strings.

2. The method according to claim 1, further comprising the step of querying about a site of said origination location, said dialing string further having an outside access line code.

3. The method according to claim 1, further comprising the step of querying about a site of said destination location, said dialing string having another code corresponding to said site.

4. The method according to claim 1, further comprising the step of querying about a billing information for said transfer, said dialing string further having a delay code.

5. The method according to claim 1, further comprising the step of informing a user at said origination location of a status of said transfer.

6. A method for creating a dialing string to establish a dial-up session for transferring data from an origination location to a destination location in a data communications environment, the steps comprising:

requesting said dial-up session;
   querying about a geographic location of said origination and destination locations;
   querying about a site of said origination location;
   querying about a billing information for said dial-up session;
   receiving from a user at least one of said geographic locations, said site and said billing information;
   automatically generating, said dialing string having at least one: (i) code corresponding to said geographic location of said destination location; (ii) outside access line code for dialing from said site; and (iii) delay code for pausing said dialing string before entering said billing information; and
   wherein at least one of said steps of querying further comprises the step of passing a query from a dial-up manager to a user at said origination location.

7. The method according to claim 6, wherein said step of generating said dialing string further comprises the step of formulating a request packet for passage between said dial-up manager and a storage means.

8. The method according to claim 7, further comprising the step of passing said request packet through a driver means.

9. The method according to claim 6, further comprising the steps of dialing one of said dialing strings of said hierarch to try and establish a connection from said origination location to said destination location.

10. The method according to claim 9, further comprising the steps of:

monitoring said step of dialing with a dial-up system manager; and
   in the event said one of said dialing strings fails to establish said connection, said dial-up system manager causing the step of dialing another of said dialing strings.

11. The method according to claim 10, further comprising the step of informing a user to a status of said connection.

12. In a computer system having a user interface including a display and a user interface selection device, a method for creating a dialing string to transfer data from an origination location to a destination location, the steps comprising:

retrieving a plurality of queries for a geographic location of said origination and destination locations;
   displaying said queries on said display;
   receiving an indication from said user interface selection device in response to said queries, said indication providing each said geographic location;
   retrieving at least one code of said dialing string, said at least one code corresponding to said geographic location of said destination location;
   displaying a hierarchy of dialing strings, said hierarchy having at least one primary and one secondary dialing string;
   dialing one of said dialing strings of said hierarchy of dialing strings to establish a connection between said origination and destination locations;
   monitoring said step of dialing to determine whether said connection is established;
   dialing another of said dialing strings of said hierarchy of dialing strings if a connection is not established; and
   displaying a status of said transfer on said display.

13. The method according to claim 12, wherein said step of retrieving further comprises the step of formulating a request packet containing said geographic location of said destination location for passage from a dial-up manager to a storage means.

14. The method according to claim 13, wherein said storage means comprises a look-up table, further comprising the step of searching said look-up table for a country code corresponding to said geographic location of said destination location.

15. A method for creating a dialing string for us in a transfer of data from an origination location to a destination location, the steps comprising:

requesting said transfer;
   querying about a geographic location of said origination and destination locations; providing said geographic locations;
   depending upon said geographic locations, providing a hierarchy of dialing strings, said hierarchy having at least one primary and one secondary dialing string, and having at least one code corresponding to said geographic location of said destination location;
   dialing one of said dialing strings of said hierarchy of dialing strings to establish a connection between said origination and destination locations;
   monitoring said step of dialing to determine whether said connection is established; and
   dialing another of said dialing strings of said hierarchy of dialing strings if the connection is not established.

16. A method for creating a dialing string to establish a dial-up session for transferring data from an origination location to a destination location in a data communications environment, the steps comprising:

requesting said dial-up session;
   querying about a geographic location of said origination and destination locations;
   querying about a site of said origination location;
   querying about a billing information for said dial-up session;
   providing said geographic locations, said site and said billing information;
   providing a hierarchy of dialing strings, each of said dialing strings having at least one: (i) code corresponding to said geographic location of said destination location; (ii) outside access line code for dialing from said site; and (iii) delay code for pausing said dialing string before entering said billing information;
   dialing one of said dialing strings of said hierarch to try and establish a connection from said origination location to said destination location;
   monitoring said step of dialing with a dial-up system manager; and
   in the event said one of said dialing strings fails to establish said connection, said dial-up system manager causing the step of dialing another of said dialing strings.

* * * * *